United States Patent [19]

Shimomura et al.

[11] Patent Number: 4,841,849

[45] Date of Patent: Jun. 27, 1989

[54] COFFEE MAKER OR LIKE BEVERAGE MAKING DEVICE

[75] Inventors: Nobuo Shimomura, Nagoya; Tomio Hotta, Kuwana, both of Japan

[73] Assignee: Kabushiki Kaisha Toshiba, Kawasaki, Japan

[21] Appl. No.: 270,341

[22] Filed: Nov. 14, 1988

[30] Foreign Application Priority Data

Nov. 19, 1987 [JP] Japan ............................ 62-176848[U]

[51] Int. Cl.[4] ............................................ A47J 31/047
[52] U.S. Cl. ........................................ 99/282; 99/285; 99/286; 99/292
[58] Field of Search .................. 99/279, 280, 281, 282, 99/283, 285, 286, 288, 292; 426/433

[56] References Cited

U.S. PATENT DOCUMENTS

| | | | |
|---|---|---|---|
| 2,576,432 | 11/1951 | Wilcox | 99/292 |
| 3,224,360 | 12/1965 | Wickenberg | 99/292 |
| 4,406,217 | 9/1983 | Dota | 99/282 |
| 4,721,034 | 1/1988 | Shimomura | 99/292 |

*Primary Examiner*—Robert W. Jenkins

*Attorney, Agent, or Firm*—Foley & Lardner, Schwartz, Jeffery, Schwaab, Mack, Blumenthal & Evans

[57] ABSTRACT

An electric siphon coffee maker including a lower container for containing water and an upper container for containing coffee powder is disclosed. The upper container is placed over the lower container so that a water feed tube of the upper container is inserted into the lower container. Heat is applied by a heater to the lower container containing water and the hot water is transferred from the lower container to the upper container by aerial pressure in the lower container. A temperature sensor senses the temperature of a portion of the device, which temperature is increased in accordance with the increase of the temperature of the water contained in the lower container in the case where heat is applied to the lower container. A heater input power control circuit acts to reduce the heater input power in accordance with the temperature sensed by the temperature sensor. A heater deenergizing circuit acts to stop energizing the heater after or immediately before the temperature sensed by the temperature sensor reaches the temperature at which the hot water transfer to the upper container is completed.

8 Claims, 6 Drawing Sheets

COFFEE MAKER OR LIKE BEVERAGE MAKING DEVICE

BACKGROUND OF THE INVENTION

1. Field of the Invention

The present invention relates to a siphon coffee maker or like beverage making device, wherein a lower container containing water is heated to obtain hot water, which is fed, by the force of vapor pressure, to an upper container containing material such as coffee powder, thereby extracting coffee or other beverage.

2. Description of the Prior Art

One of conventional siphon coffee makers of the above-described type is shown in FIG. 7. A flask-shaped lower container 3 is supported by a support arm 2 and disposed on a heater 1. An upper container 4 is disposed over the lower container 3 and has an open bottom to which a water feed tube 5 is secured. The water feed tube 5 is inserted into the lower container 3 so as to air-tightly communicate between the containers 3 and 4. The upper open end of the water feed tube 5 is covered by a filter 6 provided on the bottom of the upper container 4.

When coffee is extracted with the above-described siphon coffee maker, a desired amount of water and coffee powder is supplied into the lower and upper containers 3 and 4, respectively. The heater 1 is thereafter energized to apply heat to the lower container 3 containing water. When the water is boiled, the aerial pressure in the lower container 3 is increased, whereby the hot water is fed to the upper container 4 through the water feed tube 5 and filter 6. The hot water is mixed with coffee powder in the upper container 4. Thereafter, when the heater 1 is deenergized, the lower container 3 is cooled and the aerial pressure therein is decreased, whereby the hot water mixed with coffee powder in the upper container 4 is filtered by the filter 6 and falls into the lower container 3 through the water feed tube 5. The upper container 4 is then removed from the lower container 3 and coffee obtained in the lower container 3 is poured into a cup or cups.

The heating capacity of the heater 1 is conventionally set at a relatively large value in order to accelerate the making of hot water. When an input power of the heater 1 is set and maintained at the maximum value through a hot water making step to obtain hot water, the heater 1 is led into an over-heating condition as the temperature of water in the lower container 3 reaches the boiling point. Accordingly, the boiling phenomenon in the lower container 3 is rendered too intense at the last stage of the hot water making step. Therefore, when the hot water nearly finishes transferring from the lower container 3 to the upper container 4, the vapor generation is particularly intensified in the lower container 3. The vapor bursts up into the upper container 4 and overstirs the hot water and coffee powder therein. Consequently, coffee extracted becomes cloudy or unnecessary ingredients spoiling the flavor of coffee are extracted from coffee powder.

SUMMARY OF THE INVENTION

Therefore, an object of the present invention is to provide a coffee maker or like beverage making device wherein the vapor may be restrained from bursting up into the upper container to prevent coffee or other beverage from being overstirred in the upper container, thereby providing for beverage with good flavor.

In order to achieve the object, the coffee maker or like beverage making device in accordance with the invention comprises a lower container for containing water, an upper container for containing coffee powder, the upper container including a water feed tube extending downwardly from the bottom thereof and a filter provided so as to cover an upper end opening of the water feed tube and being disposed over the lower container so that the water feed tube is inserted into the lower container, a heater for applying heat to the lower container so that the water contained therein is boiled and that the hot water is transferred to the upper container through the water feed tube by the force of vapor pressure, temperature sensing means for sensing the temperature of a portion of the device, which temperature is increased as the temperature of the water contained in the lower container is increased, heater input power control means for reducing an input power to the heater in accordance with the temperature sensed by the temperature sensing means, and heater deenergizing means for deenergizing the heater after the temperature of the upper container sensed by the temperature sensing means corresponds to the temperature of the hot water when the feeding of the hot water to the upper container is completed.

According to the coffee maker described above, the temperature of either upper or lower container is sensed by the temperature sensing means while the water contained in the lower container is being heated. The input power to the heater is reduced by the heater input power control means in accordance with the temperature sensed by the temperature sensing means. Consequently, the over-heating of the heater may be avoided at the last stage of the making of hot water, thereby restraining the occurrence of the rising of vapor to the upper container. Furthermore, since the single temperature sensing means is utilized as a temperature sensor both for the control of heater input power and for deenergization of the heater, the coffee maker in accordance with the invention is advantageous on the point of the production cost.

In the construction that the temperature of the upper container is sensed by the temperature sensing means, detection of the transferring of the hot water to the upper container may be enhanced, thereby precisely determining when the heater should be deenergized.

In one aspect of the invention, the temperature sensing means comprises a thermally sensitive resistor, and the heater input power control means comprises an oscillation circuit generating pulse signals, the oscillation period of which is prolonged in accordance with the change of resistive value of the thermally sensitive resistor of the temperature sensing means with the increase of temperature sensed by the temperature sensing means, a monostable trigger circuit triggered in response to the pulse signals supplied thereto from the oscillation circuit, thereby inverting the output from the low level to the high level and thereafter reinverting the output from the high level to the low level after elapse of a predetermined time-constant which is determined to be shorter than an output period of the pulse signals from the oscillation circuit at least in the period from the midst of the heating operation to the heating operation completion time, and a heater drive circuit turning a switching element on and off in synchronization with the output signals generated by the monostable trigger circuit to alternately reiterate energization and deenergization of the heater, thereby reducing an energizing rate of the heater.

In the above-described arrangement, a triggering period of the monostable trigger circuit may be prolonged precisely in accordance with the change of resistive value of the thermally sensitive resistor with the increase of temperature sensed by the temperature sensing means. Consequently, the energizing rate of the heater may be reduced precisely and continuously in accordance with the resistive change of the thermally sensitive resistor (that is, the increase of temperature of the water), thereby controlling the input power of the heater with high accuracy.

Other and further objects of this invention will become obvious upon an understanding of the illustrative embodiment about to be described or will be indicated in the appended claims, and various advantages not referred to herein will occur to one skilled in the art upon employment of the invention in practice.

DESCRIPTION OF THE PREFERRED EMBODIMENT

Figure 1:
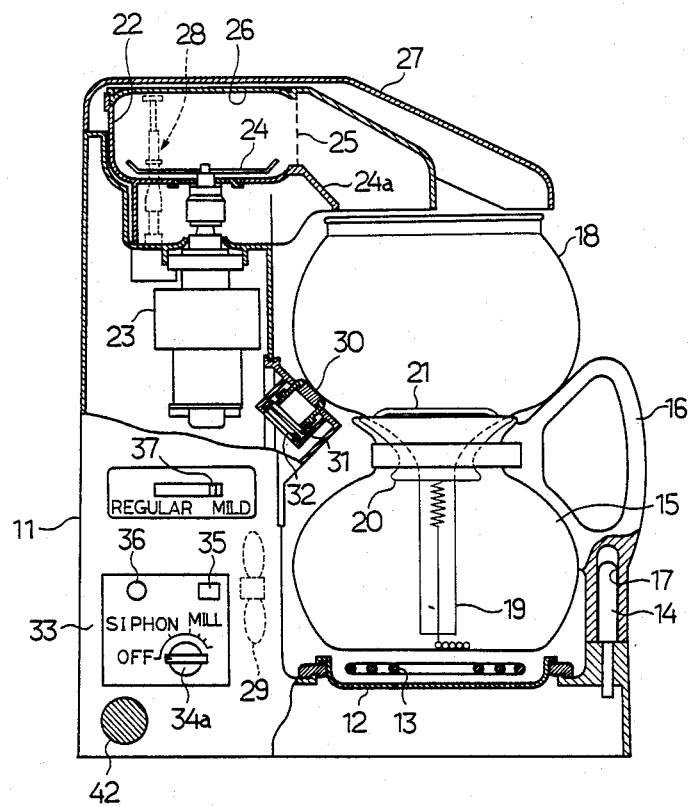
FIG. 1 is a partially exploded front view of the coffee maker embodying the invention.

An embodiment of the coffee maker in accordance with the present invention will now be described with reference to the drawings. Referring first to FIG. 1, the coffee maker comprises a case 11 and a heater support 12 provided on the right-hand lower portion thereof. A heater 13 is provided on the heater support 12. A pivot arm 14 is extended upwardly from the portion of the case 11 at the right side of the heater support 12. A lower container 15 is formed, for example, from heat-proof glass into a flask-like shape. A grip 16 is secured to the neck portion of the lower container by way of a band. The grip 16 has a support opening 17 formed in the lower portion thereof and extending downwardly. The lower container 15 is placed over the heater 13 by inserting the pivot arm 14 into the support opening 17 so that the lower container 15 is rotatably moved in the horizontal direction. An upper container 18 is also formed of heat-proof glass and has an opening in the bottom thereof. A water feed tube 19 is extended downwardly from the opening into the lower container 15. A suitable packing 20 fixed to the upper end outer periphery of the water feed tube 19 is inserted into the lower container 15 and brought into contact with the upper end inner periphery thereof, thereby air-tightly communicating between the upper and lower containers 18 and 15. The upper end opening of the water feed tube 19 is covered by a filter 21 provided on the bottom of the upper container 18.

A mill case 22 is detachably provided on the left-hand upper portion of the case 11. An electric motor 23 for mill operation is provided in the case 11 so as to be positioned under the mill case 22. A cutter 24 disposed in the mill case 22 is rotated by the motor 23. A wire-net filter 25 is secured in the right-hand wall of the mill case 22. A guide member 24a extends from the right-hand wall of the mill case 22. Coffee powder is introduced to the interior of the upper container 18 through the filter 25 along the guide member 24a. A cap 26 covers an upper opening of the mill case 22 and the guide member 24a. A lid 27 is rotatably mounted on the upper end of the case 11. A lid switch 28 is operated in response to the opening and closing of the lid 27.

Fan means 29 is provided at the left-hand side of the lower container 15 in the case 11. The fan means 29 is operated to cool the lower container 15 when the coffee extraction is completed, as will hereinafter be described. A temperature sensor 30 serving as temperature sensing means is adapted to sense the temperature of the upper container 18 and comprises a thermistor having negative temperature characteristic. The temperature sensor 30 is mounted on a sensor support 31 secured to the case 11 so as to be brought into contact with the lower outer surface of the upper container 18 obliquely from below. The temperature sensor 30 is urged obliquely upwardly by a spring 32. An operation panel 33 provided on the front side of the case 11 includes an operation knob 34a for operating a timer 34 for setting a mill operation period, a start switch 35 for starting the operation of the coffee maker, an indication lamp 36 activated during the extraction operation, and a coffee strength select switch 37 for switching the extracted coffee strength between "REGULAR" and "MILD".

Figure 2:
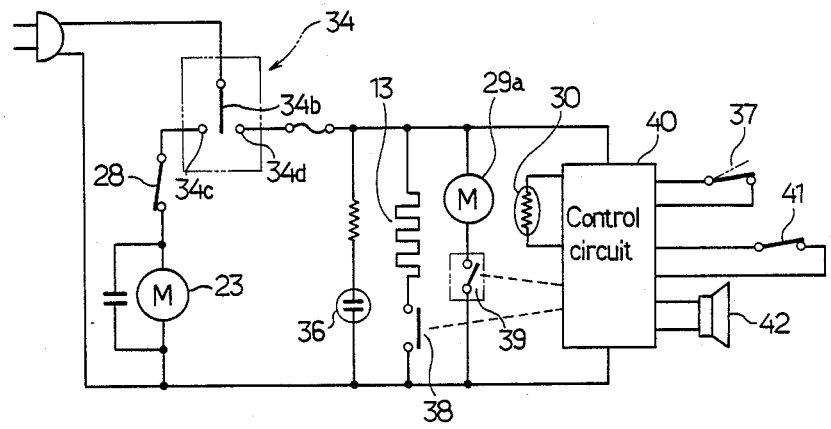
FIG. 2 is a circuit diagram schematically illustrating the overall electrical arrangement of the coffee maker.

Referring now to FIG. 2 schematically illustrating the electrical arrangement of the coffee maker, reference numeral 38 indicates a normally open relay switch as heater deenergizing means connected to the heater 13. A timer switch 39 is connected in series to a fan motor 29a of the fan means 29. The relay switch 38 and the timer switch 39 are driven by a control circuit 40. Since a control circuit for controlling the operation of the timer switch 39 is known in the art and not directly related to the subject matter of the invention, a fan control circuit is eliminated in the control circuit 40. A safety switch 41 (not shown in FIG. 1) is mounted on the sensor support 31 with the temperature sensor 30. The safety switch 41 is adapted to be turned on when the upper container 18 is correctly placed in position. A buzzer 42 is activated when the extraction operation is completed. A movable contact 34b is switched between a fixed contact 34c at the mill motor side and a fixed contact 34d at the control circuit side by a cam (not shown) driven in the timer 34.

Figure 3:
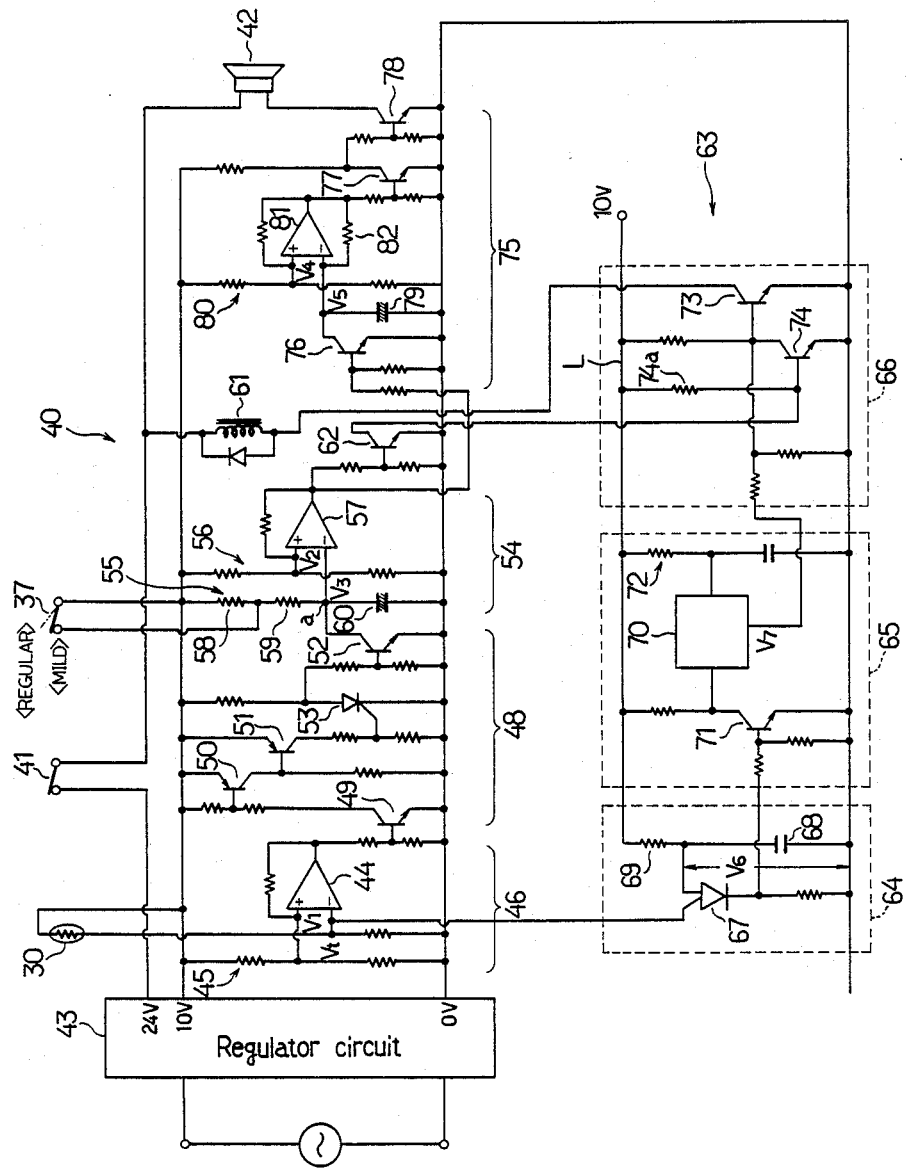
FIG. 3 is an electrical circuit diagram of the control circuit of the coffee maker.

Referring now to FIG. 3 illustrating the control circuit 40 in detail, a regulator circuit 43 supplies DC voltages of 10 V and 24 V. A comparator 44 is designed to compare a temperature signal Vt supplied from the temperature sensor 30 with a reference voltage $V_1$ supplied from a voltage divider circuit 45. When the temperature of the outer surface of the upper container 18 reaches a predetermined value $T_1$ or above with hot water rising into the upper container 18 (or $V_1 \leq Vt$), the output of the comparator 44 is inverted to the low level. The temperature sensor 30, voltage divider circuit 45, and comparator 44 constitute a hot water transfer detecting circuit 46 for detecting the transfer of the hot water from the lower container 15 to the upper container 18.

A re-heating check circuit 48 comprises four transistors 49 to 52 and a thyristor 53. The transistor 52 is turned on once when the output of the comparator 44 is inverted to the low level. When the output of the comparator 44 is inverted to the high level after completion of the extraction operation, the re-heating check circuit 48 acts to prevent the heater 13 from being energized.

A heater deenergizing time control circuit 54 is provided for controlling a period from the time when the rising of hot water into the upper container 18 is detected (or when the output of the comparator 44 is inverted to the low level) to the time when the heater 13 will be deenergized. In the embodiment, the heater deenergizing time control circuit 54 comprises the coffee strength select switch 37, a CR timer 55, a voltage divider circuit 56, and a comparator 57. The CR timer 55 includes two resistors 58 and 59 and a capacitor 60 connected in series to the resistors. The coffee strength select switch 37 is connected to the resistor 58. The collector of the transistor 52 is connected to the connecting point a common to the resistor 59 and capacitor 60. The comparator 57 acts to compare the charging voltage $V_3$ from the common connecting point a with a reference voltage $V_2$ supplied from the voltage divider circuit 56. The output of the comparator 57 is inverted to the low level where $V_2 \leq V_3$. When the coffee strength select switch 37 is switched to the "MILD" or when the select switch 37 is turned on, the resistor 58 of the CR timer 55 is short-circuited, whereby the time constant of the CR time 55 is shortened. As a result, the CR timer 55 functions, for example, as a delay timer with 30 minute delay. When the coffee strength select switch 37 is switched to the "REGULAR" or when the select switch 37 is turned off, the short-circuit condition of the resistor 58 is cleared, whereby the time constant of the CR timer 55 is prolonged. As a result, the CR timer 55 serves as a delay timer with 60 minute delay.

When a relay drive coil 61 is energized, the relay switch 38 (see FIG. 2) is turned on, thereby energizing the heater 13. Subsequently, when the relay drive coil 61 is deenergized, the relay switch 38 is turned off to thereby deenergize the heater 13. The energizing and deenergizing of the relay drive circuit 61 is controlled by a transistor 62 and a heater input control circuit 63. The base of the transistor 62 is connected to the output side of the comparator 57.

The heater input power control circuit 63 comprises an oscillation circuit 65, a monostable trigger circuit 65, and a heater drive circuit 66. The oscillation circuit 64 comprises a programmable unijunction transistor 67 which will hereinafter be referred to as "PUT", a capacitor 68, and a resistor 69. The voltage Vt (temperature signal) is supplied from the temperature sensor 30 to one of the input terminals of PUT 67. The charging voltage $V_6$ is supplied from the capacitor 68 to the other input terminal of PUT 67. The capacitor 68 is charged through the resistor 69. When the charging voltage $V_6$ reaches the value of the temperature signal Vt or where $V_6 = Vt$, the PUT 67 is turned on, and the capacitor 68 is discharged. Subsequently, the PUT 67 is turned on immediately and the capacitor 68 is re-charged. Pulse signals are cyclically generated by alternately reiterating the turning on and off of the PUT 67.

The monostable trigger circuit 65 comprises a monostable multivibrator 70, a transistor 71 for controlling trigger signals, and a time constant circuit 72. The base of the transistor 71 is connected to the output side of the PUT 67 as the output side of the oscillation circuit 64. Every time when the PUT 67 is turned on, the transistor 71 is turned on to thereby supply the monostable multivibrator 70 with a trigger signal, whereby the output $V_7$ of the monostable multivibrator 70 is inverted to the high level. A time constant $t_1$ (see FIG. 5) at which the output of the monostable multivibrator 70 is inverted to the high level is determined by the time constant of the time constant circuit 72. While the temperature of the upper container 18 is low or while the temperature of the water contained in the lower container 15 is low, the on-off period $t_2$ of the transistor 71 (input period $t_2$ of the trigger signal) is shortened. In this period, the on-off period $t_2$ of the transistor 71 is adapted to be rendered shorter than the time constant $t_1$ of the monostable multivibrator 70. The time constant $t_1$ of the monostable multivibrator 70 is adapted to be rendered longer than the on-off period $t_2$ of the transistor 71 in the midst of making hot water.

The heater drive circuit 66 comprises two transistors 73 and 74 as a switching element. The output $V_7$ of the monostable multivibrator 70 is supplied to the base of the transistor 73. The transistor 73 is connected in series to the relay drive coil 61, which is energized when the transistor 73 is turned on. The base of the other transistor 74 is connected through the resistor 74a to 10V power supply line L and further to the collector of the transistor 74. The collector side of the transistor 74 is connected to the base side of the transistor 73. The transistor 74 is turned off when the transistor 62 is turned on. The transistor 74 is turned on when the transistor 62 is turned off, whereby the transistor 73 is forced to be turned off.

Figure 4:
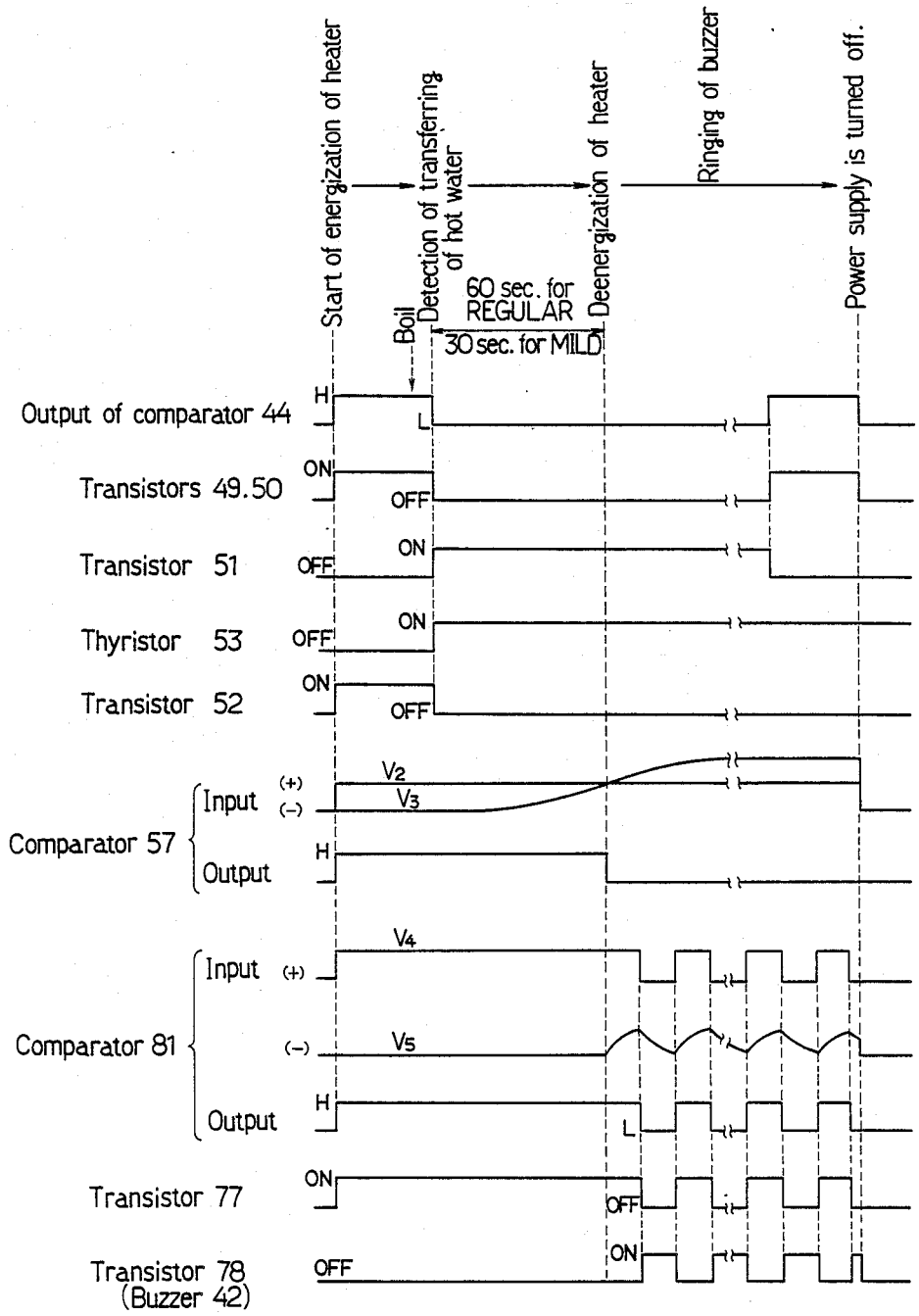
FIGS. 4 and 5 illustrate waveforms of the voltages at several points in the control circuit.
Figure 5:
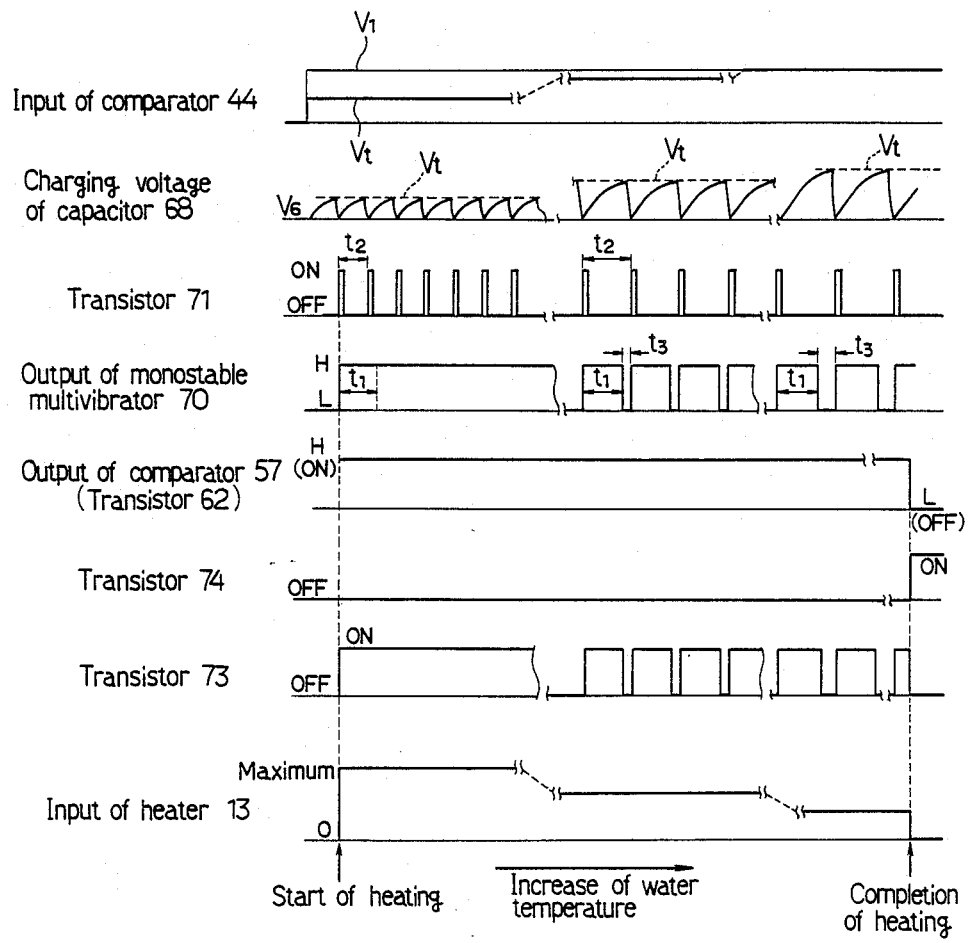
Figure 6:
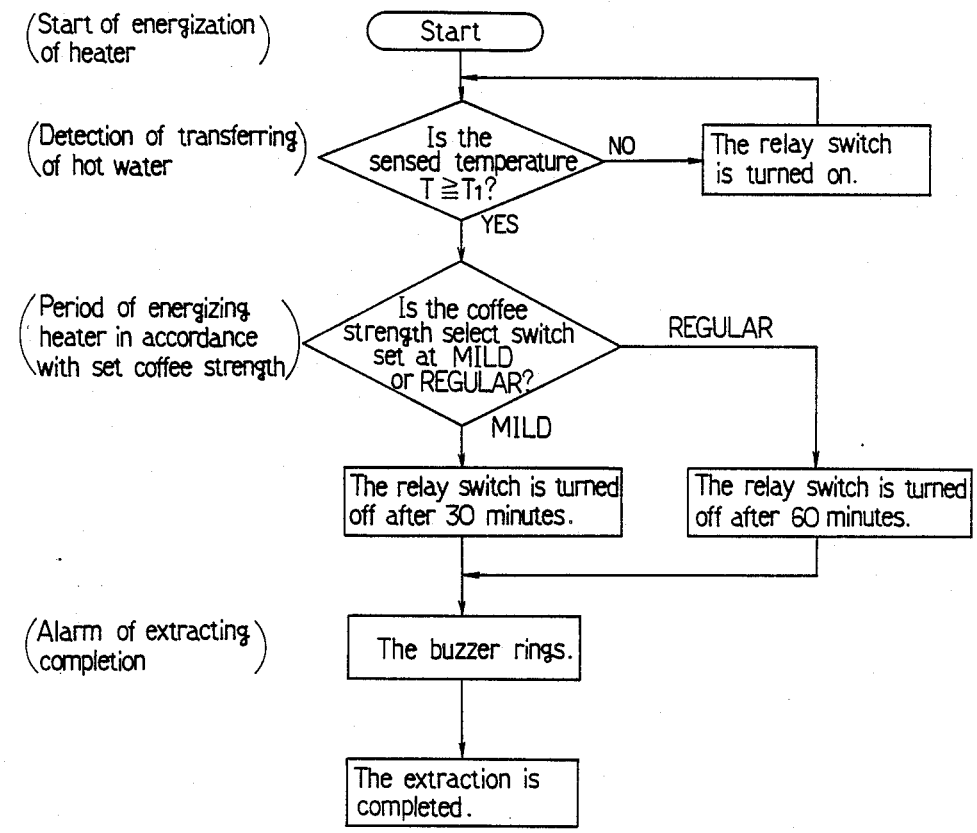
FIG. 6 is a flow chart illustrating the control algorism.
Figure 7:
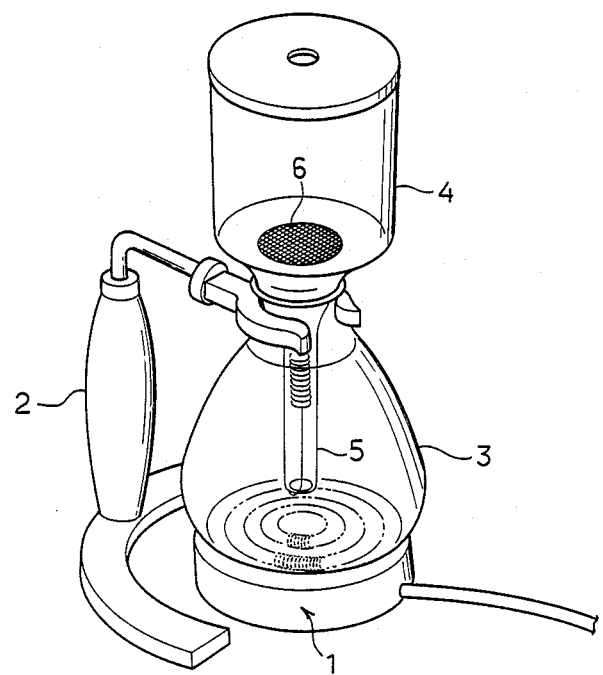
FIG. 7 is a perspective view of a conventional coffee maker.

A buzzer drive circuit 75 is provided so that the buzzer 42 intermittently rings when the heater 13 is deenergized. The buzzer drive circuit 75 comprises three transistors 76 to 78, a capacitor 79, a voltage divider circuit 80, and a comparator 81. The output signal is supplied from the comparator 57 to the transistor 76, which is turned on and off. In this while, the comparator 81 acts to compare the terminal voltage $V_5$ of the capacitor 79 with a reference voltage $V_4$ supplied from the voltage divider circuit 80. The capacitor 79 constitutes a CR timer with a feedback resistor 82 of the comparator 81 and alternately reiterates the charging and discharging at the interval of one second to alternately turning the transistors 77 and 78 on and off, whereby the buzzer 42 intermittently rings. The voltage waveforms at several points in the control circuit described above are shown in FIGS. 4 and 5, and the control algorism of the control circuit 40 is shown in FIG. 6.

Operation of the coffee maker in accordance with the invention will now be described. A predetermined amount of water and coffee beans is put into the lower container 15 and the mill case 22, respectively. The coffee strength select switch 37 is set at either "REGULAR" or "MILD". The operation knob 34b of the timer 34 is rotatively moved to "MILL". Then, when the start button 35 is depressed, the movable contact 34b of the timer 34 is brought into contact with the fixed contact 34c. The mill motor 23 is driven to rotate the cutter 24, thereby grinding the coffee beans to coffee powder. The centrifugal force induced by rotation of the cutter 24 leads the coffee powder through the filter 25 along the guide 24a and falls into the upper container 18. Subsequently, when the time counting operation of the timer 34 is completed, the operation knob 34a is automatically moved to the position of "SIPHON" and simultaneously, the movable contact 34b is brought into contact with the other fixed contact 34d, whereby the mill motor 23 is deenergized and the control circuit 40 is closed. Since the temperature of the upper container 18 is not high at this time, the resistive value of the temperature sensor 30 having negative temperature characteristic is large and the temperature signal Vt is lower than the reference signal $V_1$. Consequently, a high level signal is supplied from the comparator 44, thereby turning the transistors 49 and 50 on. Furthermore, the transistor 51 and thyristor 53 are maintained in off state and the transistor 52 is turned on. Consequently, since the capacitor 60 is short-circuited, the input voltage $V_2$ of the comparator 57 exceeds the other input voltage $V_3$ thereof, whereby the high level signal is delivered from the comparator 57. Accordingly, the transistor 62 is turned on to maintain the transistor 74 of the output control circuit 66 in the off state.

The temperature signal Vt is supplied from the temperature sensor 30 to one of the input terminals of the PUT 67 of the oscillation circuit 64. The charging voltage $V_6$ of the capacitor 68 is supplied to the other input terminal of the PUT 67. When the charging voltage $V_6$ of the capacitor 68 charged through the resistor 69 reaches the temperature signal Vt or where $V_6=Vt$, the PUT 67 is turned on and the capacitor 68 is discharged. Subsequently, the PUT 67 is immediately turned off and the capacitor 68 is re-charged. The above-described charging and discharging of the capacitor 67 (on-off of the PUT 67) is reiterated as shown in FIG. 5. The pulse signal is supplied to the base of the transistor 71 every time when the PUT 67 is turned on. When supplied with the pulse signal, the transistor 71 is turned on and a trigger signal is supplied to the monostable multivibrator 70, whereby the output $V_7$ of the monostable multivibrator 70 is inverted to the high level. The high level signal $V_7$ is supplied to the base of the transistor 73, thereby turning it on. Consequently, the relay drive coil 61 is energized and the relay switch 38 is turned on, whereby the heater 13 is energized to heat the water in the lower container 15. Where the upper container 18 is not correctly placed in position, the safety switch 41 provided in the vicinity of the temperature sensor 30 is not turned on, thereby preventing the relay drive coil 61 from being energized.

While the temperature of the upper container 18 sensed by the temperature sensor 30 is low or while the temperature of the water contained in the lower container 15 is low, the voltage of the temperature signal Vt is low. Consequently, the charging voltage of the capacitor 68 of the oscillation circuit 64 is restricted to a low level owing to on-off operation of the PUT 67 and the period of the charging and discharging thereof (the on-off period of the PUT 67) is rendered short. Therefore, since the on-off period $t_2$ of the transistor 71 (or the input period of the trigger signals) is shorter than the time constant $t_1$ of the monostable multivibrator 70, the following trigger signal is allowed to be supplied to the monostable multivibrator 70 even when the output $V_7$ thereof is at the high level, whereby the output $V_7$ of the monostable multivibrator 70 is continuously maintained at the high level. Accordingly, the transistor 73 is continuously maintained at the on state while the temperature of the upper container 18 sensed by the temperature sensor 30 is low, thereby continuously energizing the heater 13. As a result, the input power to the heater 13 is maximized so that the water in the lower container 15 is heated with high heating power.

Subsequently, as the water in the lower container 15 is heated, part of heat generated by the heater 13 is transferred to the upper container 18 and consequently, the surface temperature of the upper container 18 is gradually increased. The voltage of the temperature signal Vt delivered from the temperature sensor 30 is gradually increased with the increase of the surface temperature of the upper container 18, whereby the period of the charging and discharging of the capacitor 68 (the on-off period of the PUT 67) and hence, the on-off period $t_2$ of the transistor 71 is gradually rendered longer. The on-off period $t_2$ of the transistor 71 is rendered longer than the time constant $t_1$ of the monostable multivibrator 70 in the midst of the heating operation. Subsequently, as shown in FIG. 5, the monostable multivibrator 70 starts the oscillation operation of alternately inverting the output $V_7$ to the high and low levels (in this case, the high level duration $t_1$ of the output $V_7$ is fixed). Since the transistor 73 is turned off in the duration $t_3$ ($t_2-t_1$) in which the the output $V_7$ of the monostable multivibrator 70 is at the low level, the transistor 73 is reiteratively turned on and off to intermittently energize the relay drive coil 61. With the intermittent energization of the relay drive coil 61, the heater 13 is intermittently energized by closing and opening the relay switch 38, thereby reducing the input to the heater 13 (energizing rate in this embodiment). The temperature of the upper container 18 is increased with progress of the heating operation (or increase of the temperature of the water). Accordingly, the voltage of the temperature signal Vt is increased and the on-off period of the transistor 71 is gradually rendered long. The low level duration $t_3$ of the output $V_7$ of the monostable multivibrator 70 is gradually rendered long accordingly, whereby the input power of the heater 13 is gradually reduced.

When the water in the lower container 15 is heated to be boiled, the aerial pressure in the lower container 15 is increased owing to steam. The increased aerial pressure in the lower container 15 forces the hot water to rise to the upper container 18 through the water feed tube 19 and filter 21, and the hot water is mixed with the coffee powder in the upper container 18, thereby extracting coffee ingredients. As described above, since the input power of the heater 13 is lowered, the heater 13 may be prevented from applying an excessive amount of heat to the lower container 15 at the last stage of the heating operation, thereby reducing the phenomenon of the bursting of vapor into the upper container 18 owing to sudden boiling of water. Consequently, the hot water and coffee powder may be prevented from being overstirred owing to boiling pressure and accordingly, extracted coffee may be prevented from becoming cloudy or containing unnecessary ingredients spoiling the coffee flavor.

When the hot water is transferred to the upper container 18, the temperature of the outer peripheral surface of the upper container 18 is rapidly increased (the hot water is caused to rise to the upper container when the temperature thereof is increased to 40° C.), and the resistive value of the temperature sensor 30 is rapidly reduced with the rapid increase of the temperature of the outer peripheral surface of the upper container 18. Accordingly, the voltage of the temperature signal Vt supplied from the temperature sensor 30 to the comparator 44 is rapidly increased. When the temperature of the outer peripheral surface of the upper container 18 exceeds the hot water transfer completion temperature T (60° C. in the embodiment), the output of the comparator 44 is inverted to the low level since $Vt \geq V_1$. With inversion of the output of the comparator 44, the transistors 49 and 50 are turned off and the transistor 51 is turned on. A gate current is drawn to the thyristor 53, which is turned on, and the transistor 52 is turned off. Consequently, the charging to the capacitor 60 is started and the charging voltage $V_3$ thereof is increased. Subsequently, when the charging voltage $V_3$ exceeds the reference voltage $V_2$, the output of the comparator 57 is inverted to the low level, thereby turning the transistor 62 off. Since the transistor 74 of the output control circuit 66 is turned on, the transistor 73 is forced to be turned off, thereby deenergizing the relay drive coil 61. The relay switch 38 is turned off to thereby deenergize the heater 13. A period for which the charging voltage $V_3$ of the capacitor 60 reaches the reference voltage $V_2$ when the select switch 37 is set at REGULAR is different from that when the select switch 37 is set at MILD. That is, when the select switch 37 is switched to MILD (turned on), the resistor 58 of the CR timer 55 is short-circuited, whereby the time constant of the CR timer 55 is rendered short to thereby serve as a delay timer with 30 second delay. When the select switch 37 is switched to REGULAR (turned off), the short-circuit of the resistor 58 is cleared. As a result, the time constant of the CR timer 55 is rendered long to thereby serve as a delay timer with 60 second delay. Thus, the time when the heater 13 is deenergized may be changed by switching the select switch 37. When the heater 13 is deenergized, the timer switch 39 is simultaneously operated to thereby energize the fan motor 29a, thereby cooling the lower container 15 with the fan means 29. Since the aerial pressure in the lower container 15 is decreased as the lower container 15 is cooled, coffee in the upper container 18 is caused to fall through the filter 21 and the water feed tube 19 into the lower container 15.

When the heater 13 is deenergized or when the output of the comparator 55 is inverted to the low level, the transistor 76 of the buzzer drive circuit 75 is simultaneously turned off. Subsequently, the charging and discharging of the capacitor 79 is alternately reiterated and the output of the comparator 81 is alternately inverted to the high and low levels at an interval of, for example, one second. The transistors 77 and 78 are reiteratively turned on and off, whereby the buzzer 42 intermittently rings to alarm the operator for completion of the extraction.

According to the coffee maker described above, the increase of the temperature of the upper container 18 is detected by the temperature sensor 30 and the input power of the heater 13 is decreased by the heater input control circuit 63 in accordance with the temperature of the upper container 15 sensed by the temperature sensor 30. Consequently, an excessive amount of heat is not applied to the lower container 15 by the heater 13 at the last stage of the hot water making step. Therefore, the vapor does not excessively burst up into the upper container 18 and accordingly, coffee in the upper container 18 is not over-stirred, thereby preventing coffee from becoming cloudy and the flavor of coffee from being spoiled. Furthermore, since the input power of the heater 13 is reduced as described above, an amount of remaining heat in the lower container 13 may be decreased to that extent when the heater 13 is deenergized. Consequently, the cooling of the lower container 15 and the reduction of aerial pressure therein may be enhanced, whereby coffee is not remained in the upper container 18 longer than as required, which contributes to improve the flavor of coffee. Furthermore, since a single temperature sensor 30 is utilized both in the control of input of the heater 13 and the control of deenergizing thereof, the coffee maker is advantageous in the production cost thereof.

Since the temperature of the upper container 18 is sensed by the temperature sensor 30, transfer of the hot water to the upper container 18 may be precisely detected, whereby the time when the heater 13 is deenergized may be precisely determined. However, the temperature sensing means may be provided so as to sense the temperature of the lower container 15. In this arrangement, too, the temperature of the hot water may be accurately sensed and the time when the heater 13 is deenergized may be precisely determined. In short, the temperature sensing means is provided so as to sense the temperature of a portion of the device increasing in accordance with the increase of temperature of water contained in the lower container to which heat is applied.

Although the energizing rate of the heater 13 is reduced for the reduction of the input power of the heater 13 in the above-described embodiment, an input current of the heater 13 may be decreased to reduce the input power thereof. Furthermore, although the input power of the heater 13 is continuously reduced in accordance with the increase of temperature of the upper container 18, it may be reduced in a phased manner. Furthermore, although the input of the heater 13 (the energizing rate) is maintained at 100% for some time from the start of the heating operation, the input of the heater 13 may be gradually reduced from the start of the heating operation. Although the heater 13 is deenergized when the temperature of the upper container 18 reaches the hot water transfer completion temperature $T_1$ or above or after approximately all the hot water transfers into the upper container 18, the heater may be deenergized immediately before the hot water transfer is completed or when the temperature sensed by the temperature sensor 30 is $T_1\alpha$(° C.). In this arrangement, the remaining heat serves to complete the hot water transfer.

A microcomputer may be employed as the heater input control means instead of the heater input control circuit 63. Furthermore, the coffee maker in accordance with the invention may be applied to a coffee maker in which the mill mechanism is not provided and further may be applied to the devices for extracting black tea or other beverages.

The foregoing disclosure and drawings are merely illustrative of the principles of the present invention and are not to be interpreted in a limiting sense. The only limitation is to be determined from the scope of the appended claims.

What is claimed is:

1. A coffee maker or like beverage making device comprising:
   (a) a lower container for containing water;
   (b) an upper container for containing coffee powder, said upper container including a water feed tube extending downwardly from the bottom thereof and a filter disposed so as to cover an upper end opening of the water feed tube, said upper container being disposed over said lower container so that the water feed tube is inserted into said lower container;
   (c) a heater for applying heat to said lower container so that the water contained therein is heated to be boiled and that the hot water is transferred to said upper container through said water feed tube and said filter by aerial pressure in the lower container;

(d) temperature sensing means for sensing the temperature of a portion of the device, the temperature of which portion is increased as the temperature of the water contained in said lower container is increased;

(e) heater input power control means for reducing an input power to said heater in accordance with the temperature sensed by said temperature sensing means; and (f) heater deenergizing means for deenergizing said heater after the temperature sensed by said temperature sensing means corresponds to the temperature of the hot water when the transferring of the hot water to said upper container is completed.

2. A coffee maker or like beverage making device as claimed in claim 1, wherein said temperature sensing means is disposed so as to sense the temperature of said upper container.

3. A coffee maker or like beverage making device as claimed in claim 2, wherein said temperature sensing means comprises a thermally sensitive resistor and wherein said heater input power control means comprises an oscillation circuit generating pulse signals, the oscillation period of which is prolonged in accordance with the change of the resistive value of the thermally sensitive resistor of said temperature sensing means with the increase of the temperature of said portion of the device, the temperature of which portion is sensed by said temperature sensing means, a monostable trigger circuit triggered in response to the pulse signals supplied thereto from said oscillation circuit, thereby inverting the output thereof from a first level to a second level and re-inverting the output from the second level to the first level after elapse of a predetermined time-constant which is determined to be shorter than an output period of the pulse signals delivered from said oscillation circuit at least in a period from the midst of the heating operation to the heating completion time, and a heater drive circuit turning a switching element on and off in synchronization with the output signals generated by said monostable trigger circuit to alternately reiterate energization and deenergization of said heater, thereby reducing an energizing rate of said heater.

4. A coffee maker or like beverage making device as claimed in claim 1, wherein said temperature sensing means comprises a thermally sensitive resistor and wherein said heater input power control means comprises an oscillation circuit generating pulse signals, the oscillation period of which is prolonged in accordance with the change of the resistive value of the thermally sensitive resistor of said temperature sensing means with the increase of the temperature of said portion of the device, the temperature of which portion is sensed by said temperature sensing means, a monostable trigger circuit triggered in response to the pulse signals supplied thereto from said oscillation circuit, thereby inverting the output thereof from a first level to a second level and thereafter re-inverting the output from the second level to the first level after elapse of a predetermined time-constant period which is determined to be shorter than an output period of the pulse signals delivered from said oscillation circuit at least in a period from the midst of the heating operation to the heating operation completion time, and a heater drive circuit turning a switching element on and off in synchronization with the output signals generated by said monostable trigger circuit to alternately reiterate energization and deenergization of said heater, thereby reducing an energizing rate of said heater.

5. A coffee maker or like beverage making device comprising:

(a) a lower container for containing water;

(b) an upper container for containing coffee powder, said upper container including a water feed tube extending downwardly from the bottom thereof and a filter disposed so as to cover an upper end opening of the water feed tube, said upper container being disposed over said lower container so that the water feed tube is inserted into said lower container;

(c) a heater for applying heat to said lower container so that the water contained therein is heated to be boiled and that the hot water is transferred to said upper container through said water feed tube and said filter by aerial pressure in said lower container;

(d) temperature sensing means for sensing the temperature of a portion of the device, the temperature of which portion is increased as the temperature of the water contained in said lower container is increased;

(e) heater input power control means for reducing an input power to said heater in accordance with the temperature sensed by said temperature sensing means; and (f) heater deenergizing means for deenergizing said heater when the temperature sensed by said temperature sensing means reaches the temperature slightly lower than the temperature of the hot water when the transferring of the hot water to said upper container is completed.

6. A coffee maker or like beverage making device as claimed in claim 5, wherein said temperature sensing means is disposed so as to sense the temperature of said upper container.

7. A coffee maker or like beverage making device as claimed in claim 6, wherein said temperature sensing means comprises a thermally sensitive resistor and wherein said heater input power control means comprises an oscillation circuit generating pulse signals, the oscillation period of which is prolonged in accordance with the change of the resistive value of said thermally sensitive resistor of said temperature sensing means with the increase of the temperature of said portion of the device, the temperature of which portion is sensed by said temperature sensing means, a monostable trigger circuit triggered in response to the pulse signals supplied thereto from said oscillation circuit, thereby inverting the output thereof from a first level to a second level and thereafter re-inverting the output from the second level to the first level after elapse of a predetermined time-constant which is determined to be shorter than an output period of the pulse signals delivered from said oscillation circuit at least in a period from the midst of the heating operation to the heating completion time, and a heater drive circuit turning a switching element thereof on and off in synchronization with the output signals generated by said monostable trigger circuit to alternately reiterate energization and deenergization of said heater, thereby reducing an energizing rate of said heater.

8. A coffee maker or like beverage making device as claimed in claim 5, wherein said temperature sensing means comprises a thermally sensitive resistor and wherein said heater input power control means comprises an oscillation circuit generating pulse signals, the oscillation period of which is prolonged in accordance with the change of the resistive value of said thermally sensitive resistor of said temperature sensing means with the increase of the temperature of said portion of the device, the temperature of which portion is sensed by said temperature sensing means, a monostable trigger circuit triggered in response to the pulse signals supplied thereto from said oscillation circuit, thereby inverting the output thereof from a first level to a second level and re-inverting the output from the second level to the first level after elapse of a predetermined time-constant which is determined to be shorter than an output period of the pulse signals delivered from said oscillation circuit at least in a period from the midst of the heating operation to the heating operation completion time, and a heater drive circuit turning a switching element on and off in synchronization with the output signals generated by said monostable trigger circuit to alternately reiterate energization and deenergization of said heater, thereby reducing an energizing rate of said heater.

* * * * *